May 30, 1961 — T. VIGMOSTAD — 2,986,046
BRAKE LEVER ASSEMBLY
Filed July 11, 1958

INVENTOR.
TRYGVE VIGMOSTAD
BY
Barnes, Kisselle, Raisch & Choate
ATTORNEYS

United States Patent Office 2,986,046
Patented May 30, 1961

2,986,046
BRAKE LEVER ASSEMBLY
Trygve Vigmostad, Detroit, Mich., assignor to Mount Clemens Metal Products Company, Mount Clemens, Mich., a corporation of Michigan
Filed July 11, 1958, Ser. No. 747,944
4 Claims. (Cl. 74—540)

This invention relates to a parking brake and more particularly to a parking brake of the pawl and ratchet type.

In parking brakes of the pawl and ratchet type with which I am familiar, the pawl is constantly urged into engagement with the ratchet; and therefore, when the brake is applied, a clicking sound is produced as the pawl rides over each of the teeth in the ratchet. To some people, this clicking sound is annoying; and it is therefore an object of the present invention to provide a parking brake of the pawl and ratchet type which is silent in its operation.

A further object of the invention resides in the provision of a parking brake of the pawl and ratchet type that is constructed so that when the brake lever is moved in the brake applying direction, the pawl is automatically moved out of engagement with the teeth of the ratchet and when the pressure on the lever is released, the pawl automatically moves into engagement with the teeth on the ratchet to hold the brakes in the applied condition.

Another object of the invention resides in the provision of a friction operated member to produce the "clickless" operation of the brake lever and a means for positively insuring sufficient friction to operate the friction operated member.

In the drawings:

Fig. 5 is a fragmentary view of the brake release lever as viewed in the direction of the arrow 5 in Fig. 1.

Figure 1:
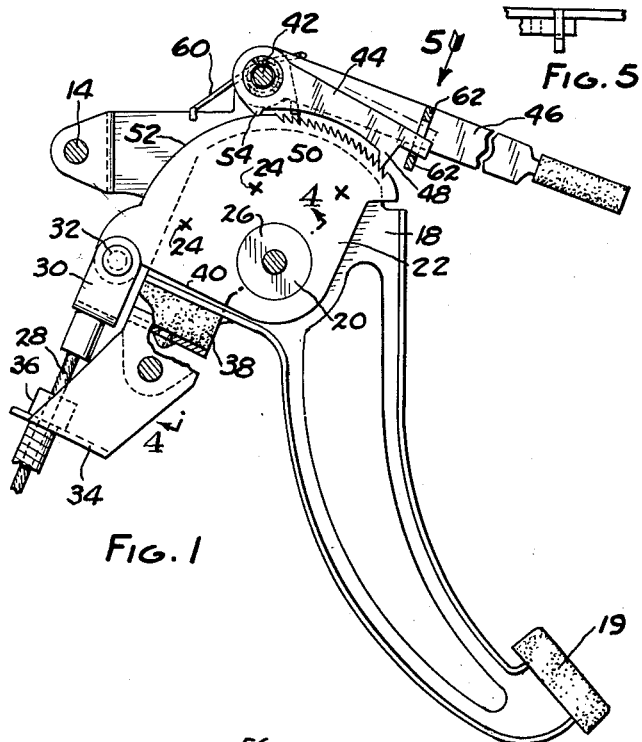
Fig. 1 is a side elevational view of the brake structure according to the present invention with parts broken away and with parts in section.
Figure 2:
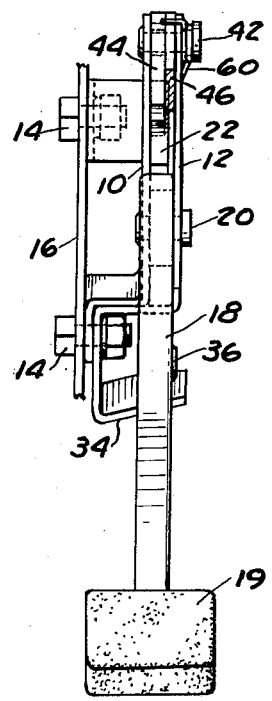
Fig. 2 is an end view of the brake assembly shown in Fig. 1.

The parking brake of this assembly includes a pair of spaced apart mounting plates 10 and 12 between which the brake mechanism is contained. These plates are riveted together in assembled relation in a manner which will be described more fully hereinafter and are apertured to receive bolts 14 for mounting the brake assembly on a support panel 16 of a vehicle. The brake lever is designated 18; and in the form of the invention shown, this brake lever comprises a foot operated lever having a pad 19 at the free end thereof so that it can be readily depressed by the operator's foot. Lever 18 is pivotally supported between mounting plates 10 and 12 by a rivet 20. Rivet 20 also secures mounting plates 10 and 12 together.

A sector plate 22 formed of hardened steel is welded to lever 18 as at 24. Within a central opening formed in sector plate 22, there is arranged a spacer 26 which accurately spaces plates 10 and 12 apart at rivet 20. A brake operating cable 28, which is normally under spring tension, is connected to sector plate 22 by a clevis as at 32. Mounting plate 12 has a flanged offset at 34 which supports a cable guide 36. A rubber bumper 38 is adapted to engage the flanged edge 40 of foot lever 18 and thus form a stop limiting the pivotal movement of lever 18 in the brake releasing direction; that is, in a counterclockwise direction as viewed in Fig. 1.

Between the upper ends of plates 10 and 12, there are pivotally supported on a rivet 42 a pawl 44 and a release lever 46. Pawl 44 and lever 46 are journalled on rivet 42 for independent pivotal movement. At its free end, pawl 44 is provided with a detent 48 engageable with a series of teeth on a ratchet portion 50 of sector plate 22. Sector plate 22 is also fashioned with an edge bearing surface 52 formed by an arc struck about rivet 20 as a center. Pawl 44 has a rounded lug 54 which bears against the arcuate bearing surface 52 of sector plate 22.

To insure satisfactory operation of the brake lever assembly of this invention, it is necessary that lug 54 bears against the arcuate bearing surface 52 with at least a slight amount of pressure. This bearing pressure is obtained by journalling pawl 44 on rivet 42 by means of a compressible rubber bushing 56. Bushing 56 is pressed into pawl 44 and surrounds a bearing sleeve 58 through which rivet 42 extends. The radial distance between the axis of rivet 42 and surface 52 is slightly less than the radial distance between the axis of bushing 56 and the radial end of lug 54. Thus, when these parts are assembled, bushing 56 is compressed slightly so as to maintain the rounded end of lug 54 in pressure contact with the arcuate bearing surface 52.

Release lever 46 is biased in a clockwise direction as viewed in Fig. 1 by a spring 60. Lever 46 is fashioned with a pair of spaced ears 62 between which the free end of pawl 44 extends. Ears 62 form a lost motion connection between release lever 46 and pawl 44.

Figure 3:
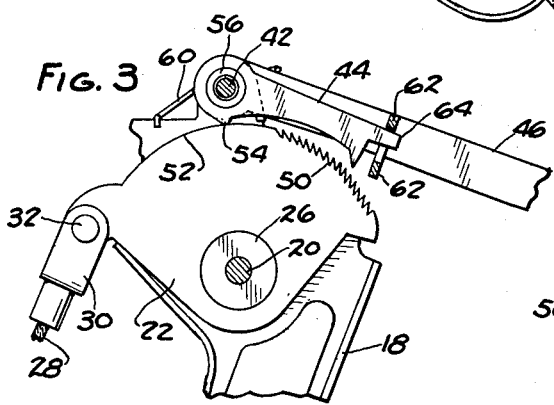
Fig. 3 is a fragmentary view of a portion of the assembly shown in Fig. 1 in a different position.
Figure 6:
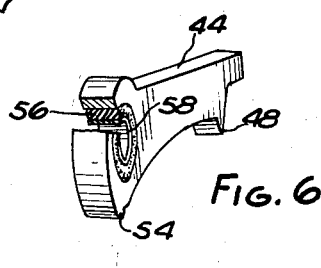
Fig. 6 is a perspective view partly in section of the pawl.
Figure 4:
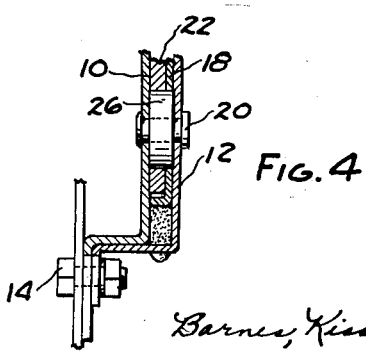
Fig. 4 is a sectional view along the line 4—4 in Fig. 1.

In operation, when the brake is in the released condition, the various parts assume the positions indicated in Fig. 1. In this condition, detent 48 of pawl 44 is engaged with one of the teeth of ratchet portion 50 near one end of the ratchet portion. When it is desired to apply the brake, the operator pushes down on pad 19 with his foot, thus rotating lever 18 in a clockwise direction. In view of the fact that lug 54 is in slight pressure contact with arcuate bearing surface 52, as soon as lever 18 starts to swing in a clockwise direction, the frictional engagement between lug 54 and bearing surface 52 causes pawl 44 to pivot upwardly in a counterclockwise direction and thus move detent 48 out of engagement with the ratchet teeth to the position illustrated in Fig. 3. In this position, the end 64 of pawl 44 abuts against the upper lug 62 on release lever 46 and continued swinging movement of foot lever 18 simply causes lug 54 to slide over the arcuate surface 52.

Keeping in mind that cable 28 is always under spring tension, as soon as the operator relieves the pressure on lever 18, lever 18 tends to swing in the counterclockwise brake releasing direction. However, as soon as this occurs, pawl 44, by reason of the interengagement of lug 54 with arcuate bearing surface 52, swings clockwise to bring detent 48 into immediate engagement with the closest ratchet tooth. In the arrangement shown, movement of pad 19 in a counterclockwise direction through an extent of less than an inch produces engagement of detent 48 with the ratchet teeth. When detent 48 engages the ratchet teeth, lever 18 is prevented from pivoting further in a clockwise direction and the brake is thus applied.

When it is desired to release the brake, the operator simply grasps the end of release lever 46 and swings it upwardly. The lower ear 62 on lever 46 engages the end 64 of pawl 44 to swing the pawl 44 upwardly and thus disengage detent 48 from the ratchet teeth. The tension on cable 28 thus swings lever 18 counterclockwise to the normal released position of the brake.

Thus, it will be seen that I have provided a brake lever assembly which is positive in its action; and even though it is of the pawl and ratchet type, it is "clickless" in its operation. Furthermore, it will be noted that the clickless feature is obtained when the brake is operated in a conventional manner and does not require additional elements such as levers or detents that must be manually manipulated in order to positively disengage the pawl from the ratchet when the brake lever is actuated in the brake applying direction. In addition it will be noted that the use of the rubber bushing 56 for journalling pawl 44 provides an effective means for insuring sufficient friction for operation of the pawl.

I claim:

1. In a parking brake for an automotive vehicle, the combination of a support, a foot operated brake lever pivotally mounted on said support, a sector plate pivotally mounted on the support and having brake applying means attached thereto, said sector plate being operatively connected with the brake lever such that pivotal movement of the brake lever in a brake applying direction causes the sector plate to swing in a direction to actuate said brake applying means for applying the brake, said sector plate having an arcuate edge generally concentric with the pivotal axis of the sector plate, one portion of said arcuate edge providing a smooth arcuate surface and another portion of said arcuate edge forming a ratchet, a pawl pivotally mounted at one end on said support and having a detent at its free end positioned normally to engage with the ratchet portion of said arcuate edge to prevent pivotal movement of the sector plate in the brake releasing direction, said pawl having at the pivotally supported end thereof an integral radially outwardly projecting portion lying in the same plane as said detent, the radially outer end of which is in rubbing contact with the smooth arcuate surface of said arcuate edge, whereby when the sector plate pivots in a brake applying direction, the pawl is pivoted by reason of said rubbing contact in a direction to disengage the detent from the ratchet and when the sector plate is pivoted in a brake releasing direction, the pawl is pivoted in a direction to engage the detent with said ratchet, means biasing the pivotally supported end of the pawl radially toward the smooth arcuate surface of said arcuate edge to insure substantial frictional contact between the radially outermost end of the said radial projection and the smooth arcuate surface of said arcuate edge, and means including a hand lever for limiting the pivotal movement of the pawl in a direction away from the ratchet and for positively retracting the pawl in a direction to disengage the detent from the ratchet.

2. The combination called for in claim 1 including a pin on said support on which said pawl is pivotally supported, the pivoted end of the pawl having an opening therein, said biasing means comprising an annular rubber bushing arranged concentrically between said pin and the opening in the pawl, the radial distance between the center of said pin and said arcuate edge of the sector plate being less than the radial distance between the radially outermost end of said projection and the axial center of said opening in the pawl.

3. The combination called for in claim 1 wherein the sector plate and brake lever are integrally connected together for movement in unison.

4. The combination called for in claim 1 wherein said last means comprises a first abutment on the hand lever adapted to engage the pawl to retract the detent from the ratchet when the hand lever is shifted in one direction and a second abutment on the hand lever spaced from the first abutment and adapted to be engaged by the pawl to limit its movement away from the ratchet in detent retracting direction.

References Cited in the file of this patent

UNITED STATES PATENTS

| | | |
|---|---|---|
| 348,083 | Williams | Aug. 24, 1886 |
| 658,990 | Kincaid | Oct. 2, 1900 |
| 1,356,007 | Pasquariello | Oct. 19, 1920 |
| 2,130,187 | Jandus | Sept. 13, 1938 |
| 2,159,821 | Sandberg et al. | May 23, 1939 |
| 2,694,945 | Jandus | Nov. 23, 1954 |
| 2,928,294 | Garrett | Mar. 15, 1960 |

FOREIGN PATENTS

| | | |
|---|---|---|
| 8,835 of 1900 | Great Britain | May 11, 1901 |
| 288,043 | Germany | Oct. 16, 1915 |
| 635,432 | Great Britain | Apr. 12, 1950 |